United States Patent
Bauer et al.

(10) Patent No.: US 9,491,601 B2
(45) Date of Patent: Nov. 8, 2016

(54) DYNAMIC VISUAL PROFILES

(71) Applicants: Jared Bauer, Portland, OR (US); Glen Anderson, Beaverton, OR (US); Jose Sia, Jr., Hillsboro, OR (US)

(72) Inventors: Jared Bauer, Portland, OR (US); Glen Anderson, Beaverton, OR (US); Jose Sia, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,125

(22) PCT Filed: Jun. 10, 2013

(86) PCT No.: PCT/US2013/044884
§ 371 (c)(1),
(2) Date: Dec. 24, 2013

(87) PCT Pub. No.: WO2014/200453
PCT Pub. Date: Dec. 18, 2014

(65) Prior Publication Data
US 2014/0364097 A1    Dec. 11, 2014

(51) Int. Cl.
*H04W 4/16* (2009.01)
*G06Q 30/02* (2012.01)
*H04L 12/58* (2006.01)

(52) U.S. Cl.
CPC ........... *H04W 4/16* (2013.01); *G06Q 30/0251* (2013.01); *H04L 51/04* (2013.01)

(58) Field of Classification Search
CPC ..... H04L 51/00; H04L 51/04; H04L 12/581; H04L 65/1089; G06Q 30/0251; G06Q 30/0277; G06Q 30/0631; G10L 15/00; G10L 15/265; G10L 15/18; H04M 2201/39; H04M 2201/40; H04M 3/4878

USPC .......... 455/414.1–414.3; 704/9, 246–257; 705/14.4–14.73; 345/629–641; 379/207.02, 265.02, 265.06
See application file for complete search history.

(56) References Cited

U.S. PATENT DOCUMENTS

| | | | | |
|---|---|---|---|---|
| 2005/0021659 | A1* | 1/2005 | Pilu et al. | 709/213 |
| 2006/0129455 | A1* | 6/2006 | Shah | G06Q 30/02 705/14.54 |
| 2006/0259473 | A1* | 11/2006 | Li | G06Q 30/02 |
| 2008/0057920 | A1* | 3/2008 | Pettit | G06Q 30/02 455/414.1 |

(Continued)

FOREIGN PATENT DOCUMENTS

| | | |
|---|---|---|
| KR | 10-2009-0118512 A | 11/2009 |
| KR | 10-2013-0026605 A | 3/2013 |

OTHER PUBLICATIONS

Lily Katz, "This app studies your text messages to recommend restaurants" retrieved on Apr. 18, 2013, Feb. 26, 2013, 3 Pages. Available at http://www.geekwire.com/2013/this-app-uses-your-text-messages-to-recommend-restaurants/.

(Continued)

*Primary Examiner* — Michael Mapa
(74) *Attorney, Agent, or Firm* — Jordan IP Law, LLC

(57) ABSTRACT

Systems and methods may provide for identifying one or more phrases in a conversation between a first user and a second user. In addition, a first visual profile may be generated based on the one or more phrases and a real-time recommendation may be generated based on the first visual profile. In one example, generating the first visual profile includes using the one or more phrases to obtain one or more images and incorporating the one or more images into the first visual profile.

24 Claims, 6 Drawing Sheets

(56) References Cited

U.S. PATENT DOCUMENTS

| | | |
|---|---|---|
| 2009/0163183 A1 | 6/2009 | O'Donoghue et al. |
| 2009/0234876 A1* | 9/2009 | Schigel ................. G06Q 30/02 |
| 2010/0010896 A1* | 1/2010 | Malik ........................ 705/14.58 |
| 2011/0202515 A1 | 8/2011 | Stiers |
| 2011/0313861 A1* | 12/2011 | Lawrence, III ........ G06Q 30/02 705/14.64 |
| 2011/0320273 A1* | 12/2011 | Miranda-Steiner .... G06Q 30/02 705/14.49 |
| 2012/0239761 A1* | 9/2012 | Linner ................ G06F 17/2765 709/206 |
| 2012/0284093 A1* | 11/2012 | Evans .................. G06Q 10/107 705/14.1 |
| 2013/0091013 A1 | 4/2013 | Wang et al. |
| 2013/0262970 A1* | 10/2013 | Srikrishna et al. ........... 715/205 |
| 2013/0297317 A1* | 11/2013 | Lee ................... H04M 1/72552 704/270.1 |

OTHER PUBLICATIONS

International Search Report and Written Opinion received for PCT Patent Application No. PCT/US2013/044884, mailed on Feb. 25, 2014, 11 Pages.

* cited by examiner

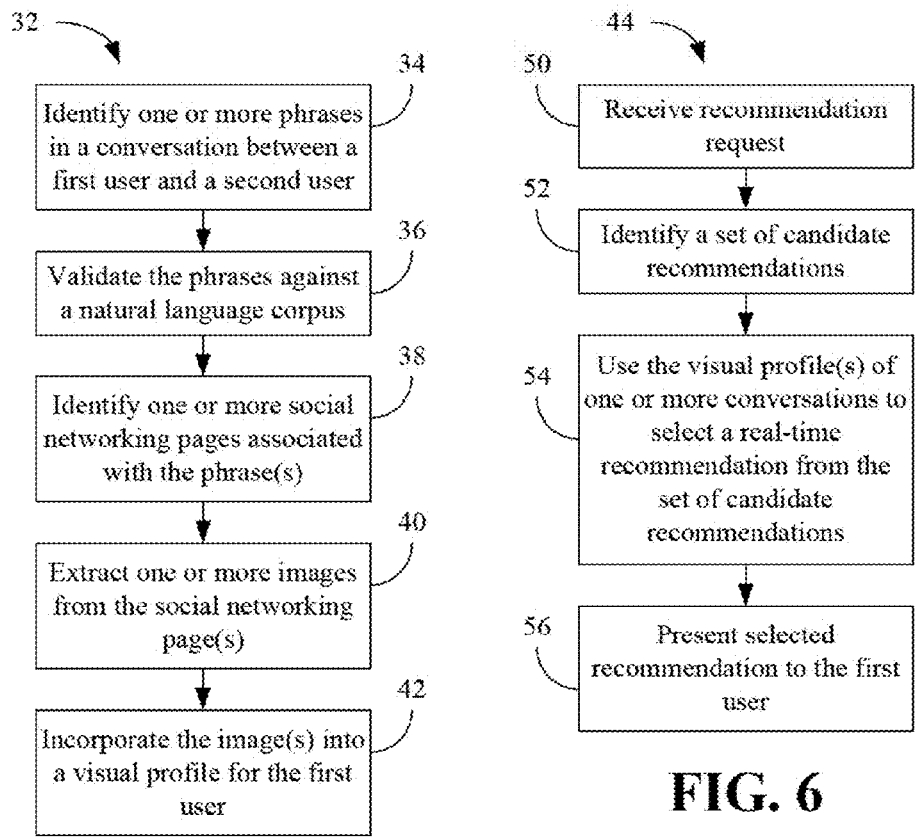
FIG. 5
FIG. 6
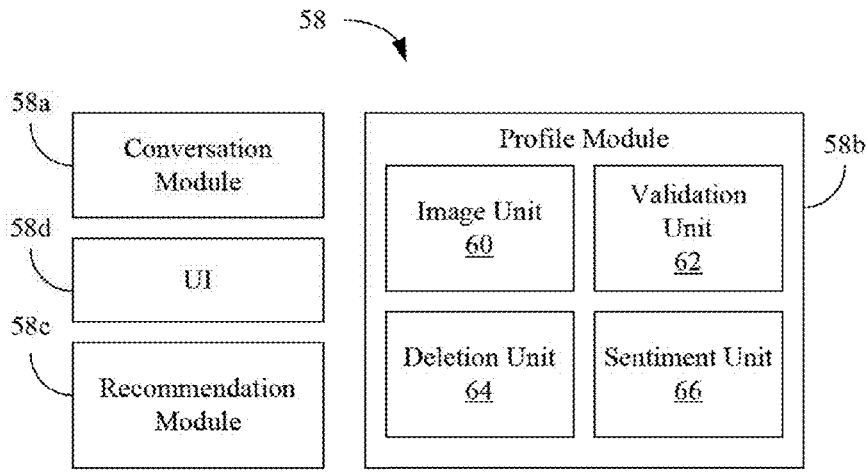
FIG. 7

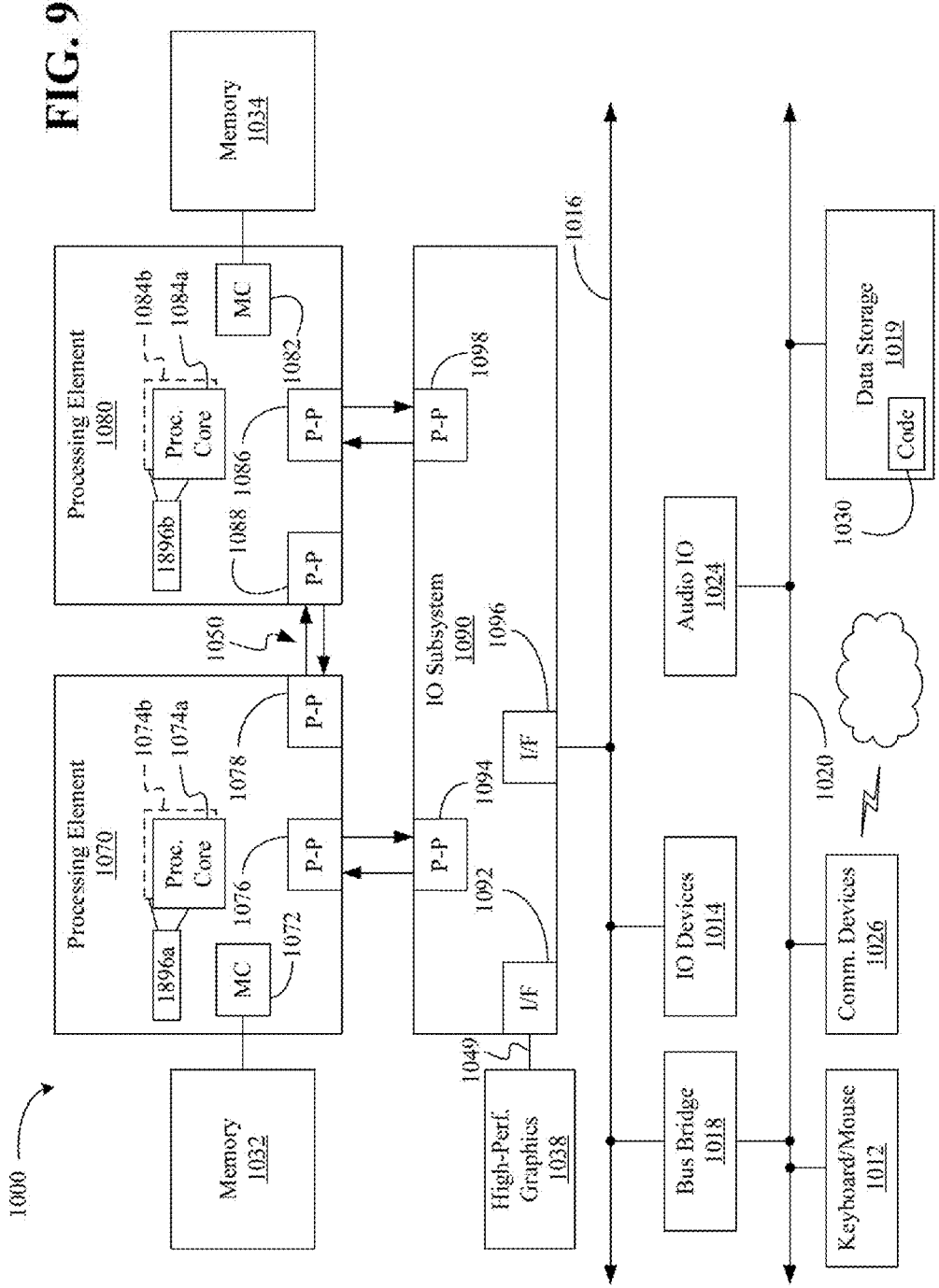

DYNAMIC VISUAL PROFILES

TECHNICAL FIELD

Embodiments generally relate to intelligent agents. More particularly, embodiments relate to the use of dynamic visual profiles to enhance real-time recommendations from intelligent agents.

BACKGROUND

Software-based intelligent agents may be used to retrieve recommendations for restaurants and other activities. In such a case, a user of a handheld device may speak or type a request that is captured and processed by an intelligent agent running on the handheld device, wherein the agent may use hidden selection criteria to generate a recommendation in response to the request.

BRIEF DESCRIPTION OF THE DRAWINGS

The various advantages of the embodiments will become apparent to one skilled in the art by reading the following specification and appended claims, and by referencing the following drawings, in which:

FIG. 5 is a flowchart of an example of a method of generating visual profiles generating according to an embodiment;

FIG. 6 is a flowchart of an example of a method of using visual profiles to generate real-time recommendations according to an embodiment;

FIG. 7 is a block diagram of an example of a logic architecture according to an embodiment;

FIG. 9 is a block diagram of an example of a system according to an embodiment.

DESCRIPTION OF EMBODIMENTS

Figure 1:
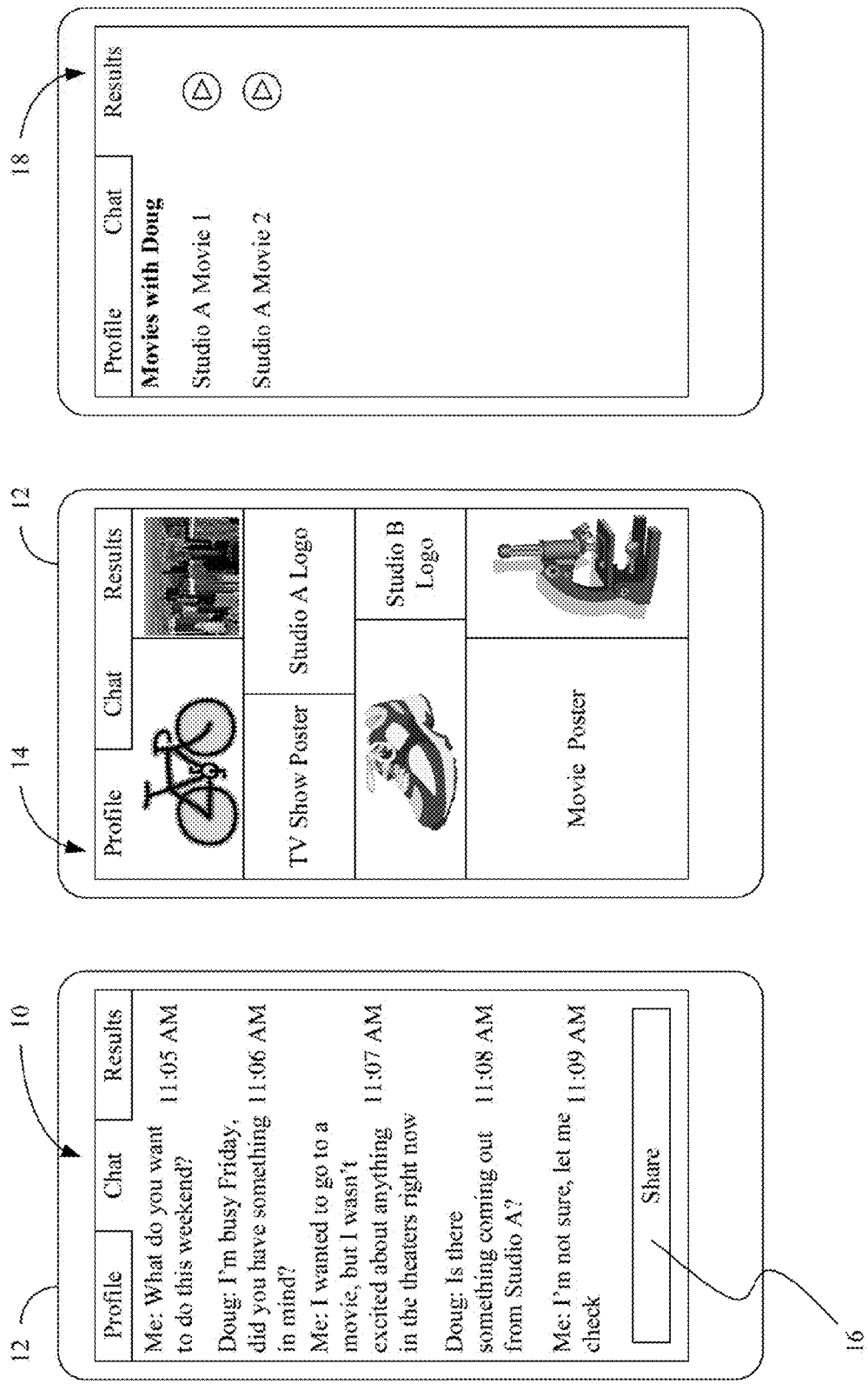
FIG. 1 is an illustration of an example of a set of screenshots of a real-time recommendation sequence according to an embodiment.

Turning now to FIG. 1, a set of screenshots is shown for a device 12. The device 12 may be a computing device such as, for example, a smart phone, smart tablet, personal digital assistant (PDA), mobile Internet device (MID), convertible tablet, notebook computer, desktop computer, smart television, and so forth, wherein the device 12 may generally present various interfaces to a user via a display such as, for example, a touch screen, liquid crystal display (LCD), and so forth. In the illustrated example, a communication interface 10 may enable a real-time conversation such as a text messaging (e.g., short messaging service/SMS) conversation, an instant messaging (IM) conversation, and so forth, to take place between two or more individuals. As will be discussed in greater detail, the conversation may also be a voice and/or video conversation such as a cellular call and/or video conferencing call between multiple individuals. In the illustrated example, the user (e.g., first user, "Me") of the device 12 conducts a chat conversation with another individual (e.g., second user, "Doug") about their plans for the weekend. The conversation may also take place between more than two users/individuals.

One or more phrases in the conversation in the communication interface 10 may be identified and used to generate a visual profile 14, wherein the visual profile 14 may include various images that are associated with the identified phrases. In the illustrated example, images of a bicycle, a city skyline, a television (TV) show poster, multiple movie studio logos, a shoe and a microscope are all displayed in the visual profile 14 based on phrases detected in conversations held by the user of the device 12. As will be discussed in greater detail, the images may have corresponding metadata that describes the content of the images and facilitates the matching of phrases to related image content. Accordingly, the visual profile 14 may be closely tailored to the personality and needs of the user of the device 12.

In one example, each conversation that a user has with different individuals may result in the generation of a different visual profile. For example, if Sally and Doug are communicating with one another, a first visual profile may be generated for that conversation. When Mark joins Sally and Doug, a second visual profile may be generated.

The user may issue a recommendation request by, for example, selecting a share option 16 from the communication interface 10, wherein upon receiving the recommendation request, the device 12 may be configured to generate a real-time recommendation 18 based on the visual profile 14. For example, the real-time recommendation 18 might contain a listing of movies produced by a particular movie studio (e.g., "Studio A") mentioned in the conversation in the communication interface 10. Additionally, the recommended movies may match one or more interests reflected in the visual profile 14 (e.g., cycling, science, particular movie genres and/or actors, and so forth). Thus, the illustrated approach uses both the conversation in the communication interface 10 and the visual profile 14 to generate real-time recommendations, which may significantly enhance the level of customization to the particular user and effectiveness of the recommendations. Moreover, by presenting the visual profile 14 to the user, the illustrated approach enables the user to understand the basis for the real-time recommendations.

Figure 3:
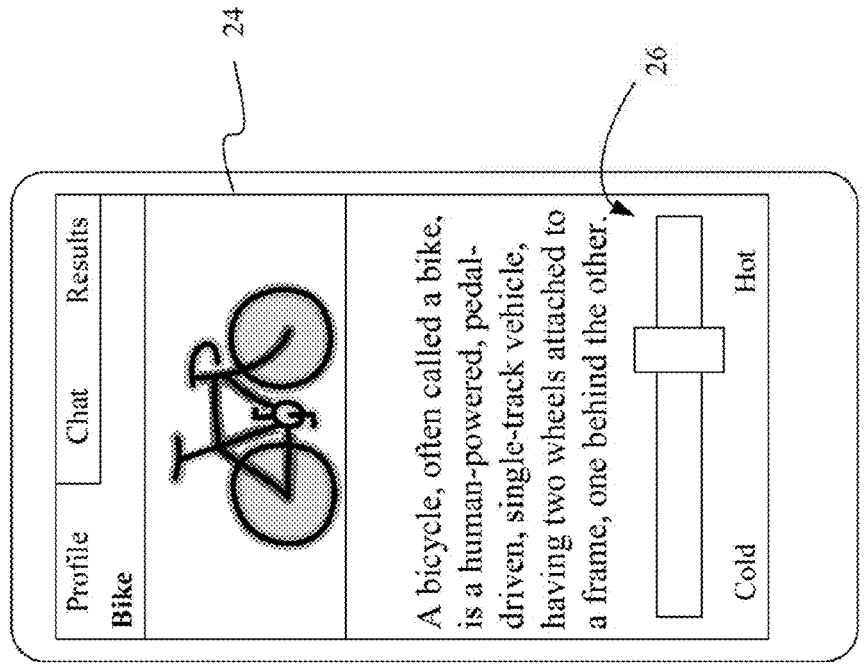
FIG. 3 is an illustration of an example of a screenshot of a profile item sentiment designation operation according to an embodiment.
Figure 2:
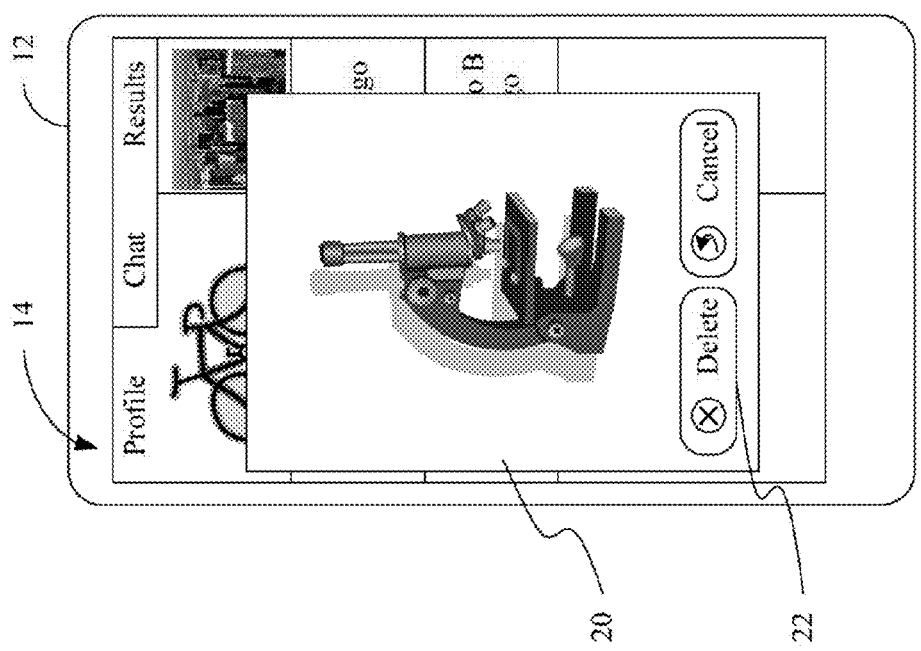
FIG. 2 is an illustration of an example of a screenshot of a profile item deletion operation according to an embodiment.

Indeed, FIGS. 2 and 3 demonstrate that the user may modify the contents of the visual profile 14 to more accurately reflect the user's likes and dislikes. For example, the user might select a particular item 20 in the visual profile 14 for deletion if the item 20 does not reflect the user's tastes and/or preferences. In such a case, the user may issue a deletion request by selecting a delete option 22, which causes the device 12 to delete the item 20 from the visual profile 14. Additionally, the user may assign a certain sentiment to a particular item 24 in the visual profile 14. In such a case, the user might touch/manipulate a slider bar 26 to make a sentiment designation (e.g., hot/cold) that causes the selected sentiment to be assigned to the item 24. Thus, the illustrated approach enables the user to control the content of the visual profile 14, and therefore control the basis of the real-time recommendations to the user of the device 12.

Figure 4:
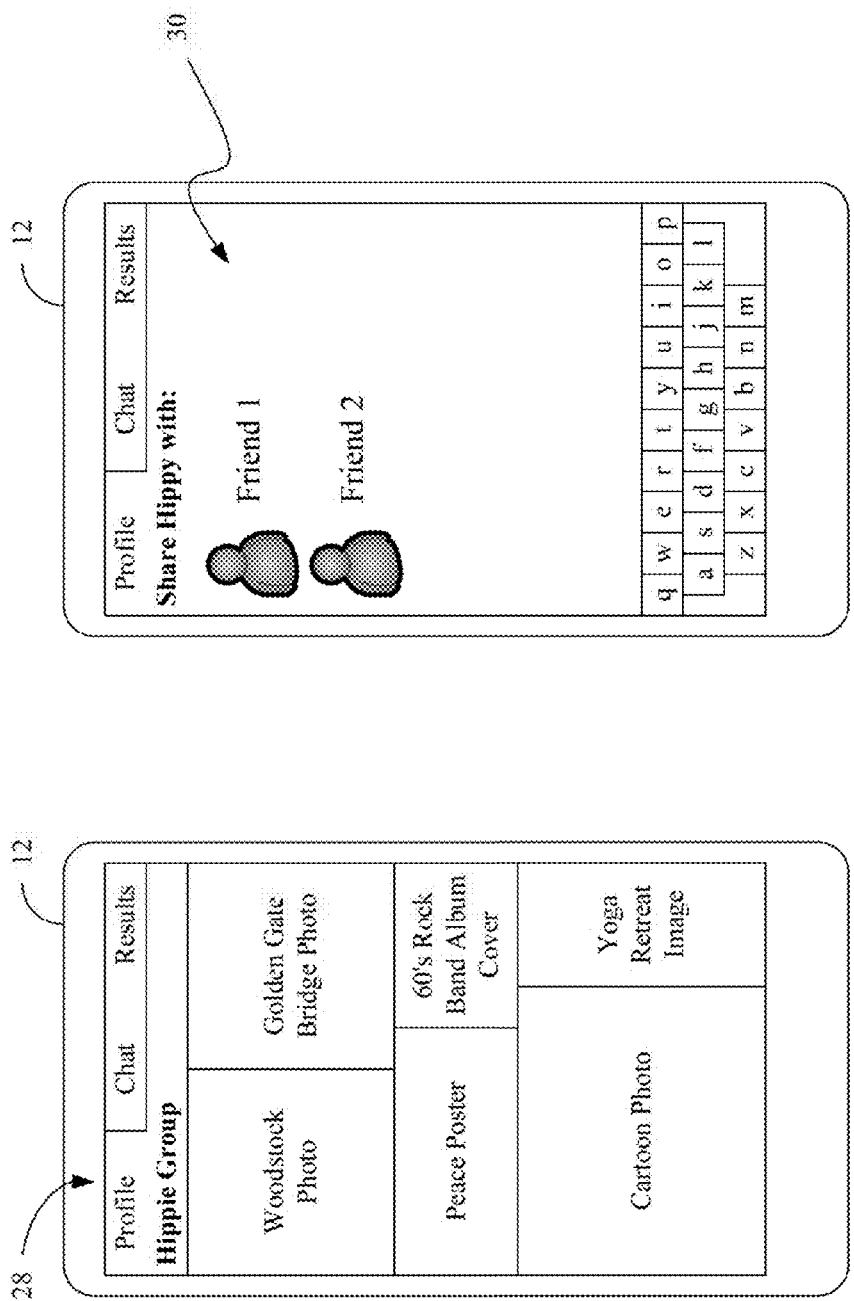
FIG. 4 is an illustration of an example of a set of screenshots of a group profile sharing operation according to an embodiment

FIG. 4 shows a set of screenshots in which a group profile 28 may be created from the contents of a visual profile, wherein the group profile 28 may enable the user to select a subset of profile items that are related to a particular interest (e.g., hippie-related items). Additionally, the images and/or underlying metadata of the group profile 28 may be shared with other users who may be affiliated with the particular interest. In such a case, the user might use a share interface 30 to enter and/or select users to receive the group profile 28. Such an approach may enable other group members to enhance the effectiveness of the real-time recommendations that they receive. Indeed, the device 12 may receive visual profiles from other conversations and/or users and take those visual profiles into consideration when making real-time recommendations. As a result, recommendations such as the recommendation 18 (FIG. 1) may be tailored to the preferences of both the user of the device 12 (e.g., Me) and other conversation participants (e.g., Doug).

Turning now to FIG. 5, a method 32 of generating visual profiles is shown. The method 32 may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 32 may be written in any combination of one or more programming languages, including an object oriented programming language such as C++ or the like and conventional procedural programming languages, such as the "C" programming language or similar programming languages. Moreover, the method 32 may be implemented using any of the aforementioned circuit technologies.

Illustrated processing block 34 provides for identifying one or more phrases in a conversation between a first user and a second user. The conversation may be a text-based conversation such as, for example, an SMS and/or IM conversation, a voice-based conversation, a video-based conversation, and so forth. In the case of a voice- and/or video-based conversation, speech recognition technology may be used to identify the phrases in block 34. Thus, as the users participate in the conversation, the content of the conversation may be parsed into one, two and three word phrases, which may then be stemmed for the removal of "stop" words such as although, before and therefore.

The identified phrases may be validated at block 36 against a natural language corpus. In one example, the term frequency inverse document frequency (TF/IDF) may be calculated for each phrase. Generally, the TF/IDF value may increase proportionally to the number of times a phrase appears in the conversation, but is offset by the frequency of the phrase in the corpus, which may help to control for the fact that some phrases are generally more common than others. Thus, the TF/IDF approach may ensure that selected phrases are used regularly by the conversation participants relative to the population at large. Any phrases having a TF/IDF value above a certain threshold may be processed further at block 38 to identify one or more social networking pages associated with the phrases. For example, the Graph API (application programming interface) from Facebook® may facilitate the identification of social networking pages for various phrases such as band names, television shows, sports teams, etc. Thus, the social networking approach may facilitate the selection of phrases that have been validated by society at large.

Illustrated block 40 extracts one or more images from the social networking pages, wherein the extracted images may be incorporated into a visual profile for the first user at block 42. Thus, the utterance of the phrase "Studio A" in a conversation might result in the logo from that particular studio being extracted from the studio's social networking page and added to a visual profile such as, for example, the visual profile 14 (FIG. 1). Similarly, the occurrence of the phrase "New York skyline" in a conversation may result in a photo of the New York City skyline being extracted from the city's social networking page and added to a visual profile such as, for example, the visual profile 14.

The method 32 may also provide for presenting the visual profile to the first user, receiving input from the first user and modifying the visual profile based on the input. If the input includes a deletion request, modifying the visual profile may include deleting one or more items such as the item 20 (FIG. 2) from the visual profile in response to the deletion request. If, on the other hand, the input includes a sentiment designation made via an interface such as a slider bar 26 (FIG. 3), modifying the visual profile may include associating the sentiment designation with one or more items in the visual profile. Indeed, the sentiment designation may enable the refinement of results through negation (e.g., "I want to find a bar that is the opposite of a biker bar").

FIG. 6 shows a method 44 of using visual profiles to generate real-time recommendations. The method 44 may also be implemented in a computing device as a set of logic instructions and/or firmware stored in a machine- or computer-readable medium such as RAM, ROM, PROM) flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 50 provides for receiving a recommendation request from a user of a computing device such as, for example, the device 12 (FIG. 1). A set of candidate recommendations may be identified at block 52 in response to the recommendation request. In one example, a prediction API such as the Google® prediction API may be used to associate chat conversations with types of requests (e.g., dinner, lunch, coffee, bars, casual dinner, etc.). Once the type of request has been identified, a recommendation engine such as, for example, the Yelp® engine may be used to obtain the set of candidate recommendations.

Illustrated block 54 uses the visual profile of a conversation between the first user and the second user (and/or other visual profiles of other conversations, a group profile associated with multiple users, and so forth) to select a real-time recommendation from the set of candidate recommendations. Thus, the visual profile may act as a filter to identify real-time recommendations, which may be presented to the user at block 56.

Turning now to FIG. 7, a logic architecture 58 (58*a*-58*d*) is shown in which real-time recommendations may be generated based on visual profiles and user conversations. The logic architecture 58 may generally be implemented in a computing device such as for example, the device 12 (FIG. 1) and may involve one or more aspects of the method 32 (FIG. 5) and/or the method 44 (FIG. 6), already discussed. In the illustrated example, a conversation module 58*a* identifies one or more phrases in a conversation between a first user and a second user, and a profile module 58*b* generates a first visual profile based on the one or more phrases.

Additionally, a recommendation module 58e may generate a real-time recommendation based on the visual profile.

In one example, the profile module 58b includes an image unit 60 to use the one or more phrases to obtain one or more images and incorporate the one or more images into the first visual profile and a validation unit 62 to validate the one or more phrases against a natural language corpus. The validation unit 62 may also identify one or more social networking pages associated with the one or more phrases, wherein the image unit 60 may extract the one or more images from the one or more social networking pages. Additionally, the illustrated logic architecture 58 includes a user interface (UI) 58d that presents the first visual profile to the first user and receives input from the first user, wherein the profile module 58b may modify the first visual profile based on the input. In one example, if the input includes a deletion request, the profile module 58b includes a deletion unit 64 to delete one or more items from the first visual profile in response to the deletion request. If, on the other hand, the input includes a sentiment designation, the profile module 58b may include a sentiment unit 66 that associates the sentiment designation with one or more items in the first visual profile.

Moreover, the profile module 58b may identify metadata associated with a second visual profile for another conversation and/or user, wherein the real-time recommendation is generated further based on the metadata associated with the second visual profile. The illustrated profile module 58b may also share metadata associated with the first visual profile with one or more additional users and formulate group profiles in response to input from the first user.

Figure 8:
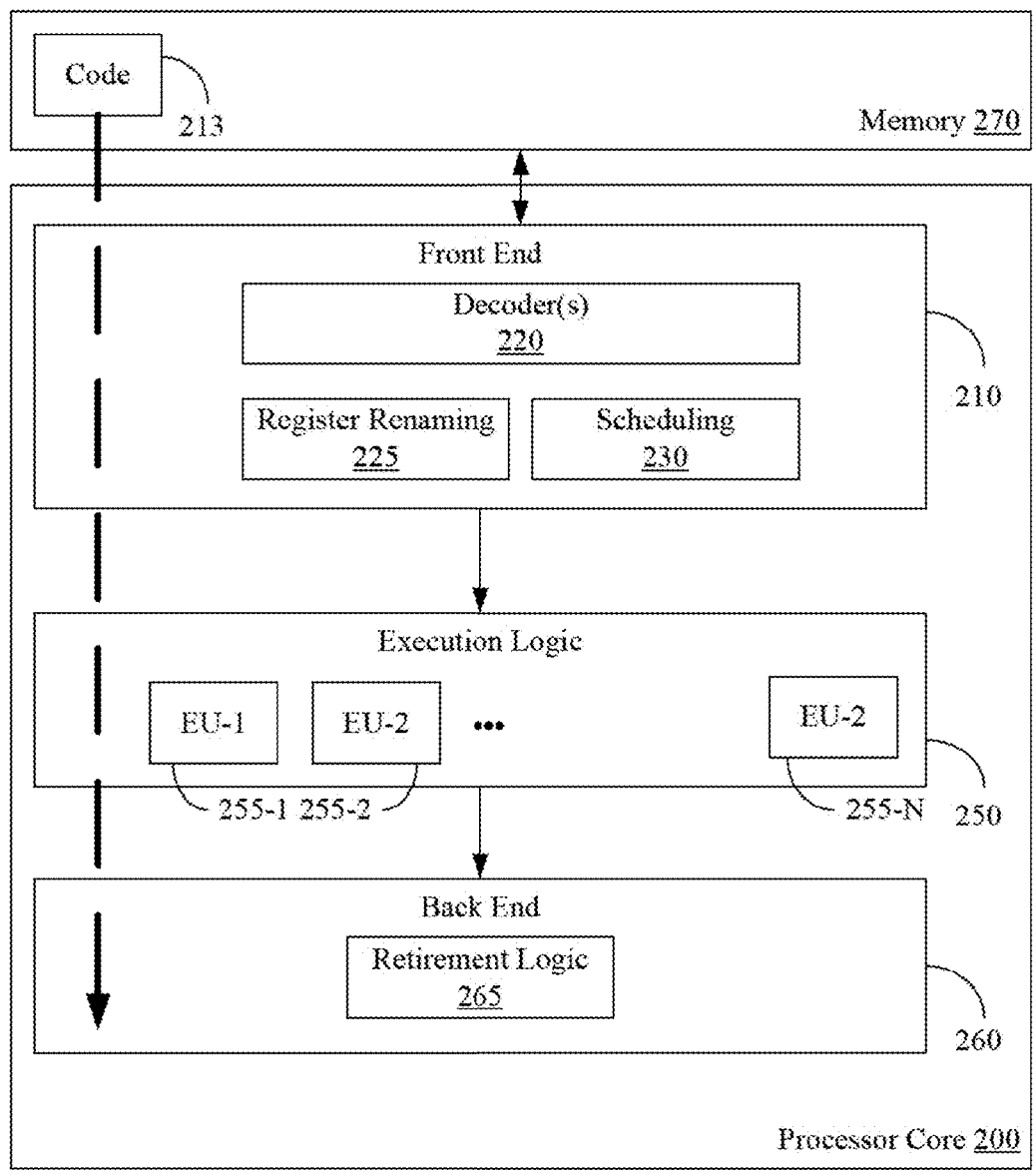
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 32 (FIG. 5) and/or the method 44 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a Manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 32 (FIG. 5) and/or the method 44 (FIG. 6), and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include an apparatus to make recommendations, having a conversation module to identify one or more phrases in a conversation between a first user and a second user, a profile module to generate a first visual profile for the first user based on the one or more phrases, and a recommendation module to generate a real-time recommendation based on the visual profile.

Example 2 may include the apparatus of Example 1, wherein the profile module includes an image unit to use the one or more phrases to obtain one or more images and incorporate the one or more images into the first visual profile.

Example 3 may include the apparatus of Example 2, wherein the profile module further includes a validation unit to validate the one or more phrases against a natural language corpus and identify one or more social networking pages associated with the one or more phrases, and wherein the image unit is to extract the one or more images from the one or more social networking pages.

Example 4 may include the apparatus of any one of Examples 1 to 3, further including a user interface to present the first visual profile to the first user and receive input from the first user, wherein the profile module is to modify the first visual profile based on the input.

Example 5 may include the apparatus of Example 4, wherein the input is to include a deletion request, and wherein the profile module includes a deletion unit to delete one or more items from the first visual profile in response to the deletion request.

Example 6 may include the apparatus of Example 4, wherein the input is to include a sentiment designation, and wherein the profile module includes a sentiment unit to associate the sentiment designation with one or more items in the first visual profile.

Example 7 may include the apparatus of any one of Examples 1 to 3, wherein the profile module is to identify metadata associated with a second visual profile, and wherein the real-time recommendation is to be generated further based on the metadata associated with the second visual profile.

Example 8 may include the apparatus of any one of Examples 1 to 3, wherein the profile module is to share metadata associated with the first visual profile with one or more additional users.

Example 9 may include a method of making recommendations, comprising identifying one or more phrases in a conversation between a first user and a second user, generating a first visual profile for the first user based on the one or more phrases, and generating a real-time recommendation based on the visual profile.

Example 10 may include the method of Example 9, wherein generating the first visual profile includes using the one or more phrases to obtain one or more images, and incorporating the one or more images into the first visual profile.

Example 11 may include the method of Example 10, wherein using the one or more phrases to obtain the one or more images includes validating the one or more phrases against a natural language corpus, identifying one or more social networking pages associated with the one or more phrases, and extracting the one or more images from the one or more social networking pages.

Example 12 may include the method of any one of Examples 9 to 11, further including presenting the first visual profile to the first user, receiving input from the first user, and modifying the first visual profile based on the input.

Example 13 may include the method of Example 12, wherein the input includes a deletion request, and wherein modifying the first visual profile includes deleting one or more items from the first visual profile in response to the deletion request.

Example 14 may include the method of Example 12, wherein the input includes a sentiment designation, and wherein modifying the first visual profile includes associating the sentiment designation with one or more items in the first visual profile.

Example 15 may include the method of any one of Examples 9 to 11, further including identifying metadata associated with a second visual profile, wherein the real-time recommendation is generated further based on the metadata associated with the second visual profile.

Example 16 may include the method of any one of Examples 9 to 11, further including sharing metadata associated with the first visual profile with one or more additional users.

Example 17 may include at least one computer readable storage medium comprising a set of instructions which, if executed by a computing device, cause the computing device to identify one or more phrases in a conversation between a first user and a second user, generate a first visual profile for the first user based on the one or more phrases, and generate a real-time recommendation based on the visual profile.

Example 18 may include the at least one computer readable storage medium of Example 17, wherein the instructions, if executed, cause a computing device to use the one or more phrases to obtain one or more images, and incorporate the one or more images into the first visual profile.

Example 19 may include the at least one computer readable storage medium of Example 18, wherein the instructions, if executed, cause a computing device to validate the one or more phrases against a natural language corpus, identify one or more social networking pages associated with the one or more phrases, and extract the one or more images from the one or more social networking pages.

Example 20 may include the at least one computer readable storage medium of any one of Examples 17 to 19, wherein the instructions, if executed, cause a computing device to present the first visual profile to the user, receive input from the user, and modify the first visual profile based on the input.

Example 21 may include the at least one computer readable storage medium of Example 20, wherein the input is to include a deletion request, and wherein the instructions, if executed, cause a computing device to delete one or more items from the first visual profile in response to the deletion request.

Example 22 may include the at least one computer readable storage medium of Example 20, wherein the input is to include a sentiment designation, and wherein the instructions, if executed, cause a computing device to associate the sentiment designation with one or more items in the first visual profile.

Example 23 may include the at least one computer readable storage medium of any one of Examples 17 to 19, wherein the instructions, if executed, cause a computing device to identify metadata associated with a second visual profile, wherein the real-time recommendation is to be generated further based on the metadata associated with the second visual profile.

Example 24 may include the at least one computer readable storage medium of any one of Examples 17 to 19, wherein the instructions, if executed, cause a computing device to share metadata associated with the first visual profile with one or more additional users.

Example 25 may include an apparatus to make recommendations, comprising means for performing the method of any one of Examples 9 to 16.

Techniques described herein may therefore significantly enhance the user experience with regard to intelligent agent recommendations by using conversational content to create visual profiles, which may in turn be used to filter candidate recommendations. Additionally, the visual profiles may be configurable by the end user in order to annotate and/or remove specific items in the visual profile. Moreover, more advanced operations such as item grouping and profile sharing may be implemented to improve the recommendation results of the local user as well as other, remote users.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to make recommendations, comprising:
a conversation module, at least partially implemented using hardware, to identify one or more phrases in a conversation between a first user and a second user;
a profile module, at least partially implemented using hardware, to generate a first visual profile based on the one or more phrases and a sentiment designation received from one of the first user and the second user via a user interface on the apparatus, and to generate a first group profile from the first visual profile, and
a recommendation module, at least partially implemented using hardware, to generate a first real-time recommendation based on the first visual profile,
wherein the first group profile comprises a plurality of profile items representing different interests of one or more of the first user and the second user,
wherein the sentiment designation is to correspond to one or more selected items in the first visual profile, and
wherein a subset of the plurality of profile items of the first group profile that are related to a particular interest is selected via a share interface and shared with selected users, and the recommendation module is to generate a second real-time recommendation based on a second group profile received from one or more additional users.

2. The apparatus of claim 1, wherein the profile module includes an image unit, at least partially implemented using hardware, to use the one or more phrases to obtain one or more images and incorporate the one or more images into the first visual profile.

3. The apparatus of claim 2, wherein the profile module further includes a validation unit, at least partially implemented using hardware, to validate the one or more phrases against a natural language corpus and identify one or more social networking pages associated with the one or more phrases, and wherein the image unit is to extract the one or more images from the one or more social networking pages.

4. The apparatus of claim 1, further including the user interface to present the first visual profile to the first user and receive input from the first user, wherein the profile module is to modify the first visual profile based on the input.

5. The apparatus of claim 4, wherein the input is to include a deletion request, and wherein the profile module includes a deletion unit to delete one or more items from the first visual profile in response to the deletion request.

6. The apparatus of claim 4, wherein the input is to include the sentiment designation, and wherein the profile module includes a sentiment unit to associate the sentiment designation with one or more items in the first visual profile.

7. The apparatus of claim 1, wherein the profile module is to identify metadata associated with a second visual profile, and wherein the real-time recommendation is to be generated further based on the metadata associated with the second visual profile.

8. The apparatus of claim 1, wherein the profile module is to share metadata associated with the first visual profile with the one or more additional users.

9. A method of making recommendations, comprising:
identifying one or more phrases in a conversation between a first user and a second user;
generating a first visual profile based on the one or more phrases and a sentiment designation received from one of the first user and the second user via a user interface;
generating a first group profile from the first visual profile, and generating a first real-time recommendation based on the first visual profile, wherein the first group profile comprises a plurality of profile items representing different interests of one or more of the first user and the second user, wherein the sentiment designation corresponds to one or more selected items in the first visual profile, and wherein a subset of the plurality of profile items of the first group profile that are related to a particular interest is selected via a share interface and shared with selected users, and a second real-time recommendation is generated based on a second group profile received from one or more additional users.

10. The method of claim 9, wherein generating the first visual profile includes:

using the one or more phrases to obtain one or more images; and incorporating the one or more images into the first visual profile.

11. The method of claim 10, wherein using the one or more phrases to obtain the one or more images includes:

validating the one or more phrases against a natural language corpus;

identifying one or more social networking pages associated with the one or more phrases; and extracting the one or more images from the one or more social networking pages.

12. The method of claim 9, further including:

presenting the first visual profile to the first user;

receiving input from the first user; and modifying the first visual profile based on the input.

13. The method of claim 12, wherein the input includes a deletion request, and wherein modifying the first visual profile includes deleting one or more items from the first visual profile in response to the deletion request.

14. The method of claim 12, wherein the input includes the sentiment designation, and wherein modifying the first visual profile includes associating the sentiment designation with one or more items in the first visual profile.

15. The method of claim 9, further including identifying metadata associated with a second visual profile, wherein the real-time recommendation is generated further based on the metadata associated with the second visual profile.

16. The method of claim 9, further including sharing metadata associated with the first visual profile with the one or more additional users.

17. At least one non-transitory computer readable storage medium comprising a set of instructions which, when executed by a computing device, cause the computing device to:

identify one or more phrases in a conversation between a first user and a second user;

generate a first visual profile based on the one or more phrases and a sentiment designation received from one of the first user and the second user via a user interface;

generate a first group profile from the first visual profile, and generate a first real-time recommendation based on the first visual profile, wherein the first group profile comprises a plurality of profile items representing different interests of one or more of the first user and the second user, wherein the sentiment designation is to correspond to one or more selected items in the first visual profile, and wherein a subset of the plurality of profile items of the first group profile that are related to a particular interest is selected via a share interface and shared with selected users, and a second real-time recommendation is to be generated based on a second group profile received from one or more additional users.

18. The at least one non-transitory computer readable storage medium of claim 17, wherein the instructions, when executed, cause a computing device to:

use the one or more phrases to obtain one or more images; and incorporate the one or more images into the first visual profile.

19. The at least one non-transitory computer readable storage medium of claim 18, wherein the instructions, when executed, cause a computing device to:

validate the one or more phrases against a natural language corpus;

identify one or more social networking pages associated with the one or more phrases; and extract the one or more images from the one or more social networking pages.

20. The at least one non-transitory computer readable storage medium of claim 17, wherein the instructions, when executed, cause a computing device to:

present the first visual profile to the user;

receive input from the user; and modify the first visual profile based on the input.

21. The at least one non-transitory computer readable storage medium of claim 20, wherein the input is to include a deletion request, and wherein the instructions, when executed, cause a computing device to delete one or more items from the first visual profile in response to the deletion request.

22. The at least one non-transitory computer readable storage medium of claim 20, wherein the input is to include the sentiment designation, and wherein the instructions, when executed, cause a computing device to associate the sentiment designation with one or more items in the first visual profile.

23. The at least one non-transitory computer readable storage medium of claim 17, wherein the instructions, when executed, cause a computing device to identify metadata associated with a second visual profile, wherein the real-time recommendation is to be generated further based on the metadata associated with the second visual profile.

24. The at least one non-transitory computer readable storage medium of claim 17, wherein the instructions, when executed, cause a computing device to share metadata associated with the first visual profile with the one or more additional users.

* * * * *